United States Patent [19]

Lopez et al.

[11] 3,928,887

[45] Dec. 30, 1975

[54] WINDSHIELD WIPER COUPLING STRUCTURES

[75] Inventors: Manuel Lopez, Trumbull; Joseph R. Bourassa, Huntington, both of Conn.

[73] Assignee: Parker-Hannifin Corporation, Shelton, Conn.

[22] Filed: Oct. 1, 1973

[21] Appl. No.: 402,402

[52] U.S. Cl. ............................ 15/250.32; 15/250.42
[51] Int. Cl. .................................................... B60s 1/40
[58] Field of Search ....... 15/250.31, 250.32, 250.35, 15/35, 250.42

[56] References Cited
UNITED STATES PATENTS

| | | | |
|---|---|---|---|
| 3,254,358 | 6/1966 | Wise | 15/250.32 |
| 3,750,227 | 8/1973 | Hayhurst | 15/250.32 |
| 3,757,377 | 9/1973 | Hayhurst | 15/250.32 |

*Primary Examiner*—Peter Feldman
*Attorney, Agent, or Firm*—Albert C. Johnston

[57] ABSTRACT

A windshield wiper blade holder is made as a unitary molding of a resilient plastic material having a central portion of the primary bow member formed with molded structures for coupling it through an attached unitary connector molding with a wiper arm end of the bayonet mounting type and, alternatively, for coupling it directly with the side pin of a wiper arm of the side mounting type. Each coupling structure provides a secure pivotal connection yet enables the wiper components to be detached easily for replacement.

10 Claims, 8 Drawing Figures

WINDSHIELD WIPER COUPLING STRUCTURES

The present invention relates to windshield wipers and, more particularly, to structures of a wiper blade pressure distributor, or blade holder, whereby this component can easily be coupled securely to a windshield wiper arm of either the common bayonet mounting type or the common side mounting type.

Wiper arms of the side mounting type carry a grooved pin protruding to one side of the arm end for coupling with a blade holder provided with a fitting to receive and latch the pin. They are used on automobiles having a recess in the hood at the base of the windshield to conceal the wipers when not in use. The more conventional wiper arms of the bayonet mounting type have a flat finger-like end which overlies a central portion of the blade holder and is attached to it through a coupler that is pivoted to the holder and interlocks with a detent on the arm end.

The wiper blade holders heretofore furnished as original equipment on automobiles are not usable interchangeably on both of the common types of wiper arms. It is desirable, for the replacement of damaged or defective blade holders, that automobile owners and users have available a blade holder that will fit and be easily attachable to a wiper arm of either type. The commercially available replacement blade holders of that character leave much to be desired in regard to economy of manufacture and security of coupling of the components under the exacting conditions of use, or of possible abuse, which must be anticipated.

The principal object of the present invention is to provide a windshield wiper blade holder of economical molded construction which has coupling structures in part formed integrally with its primary bow member and in part joined detachably thereto so that it is easily and securely attachable for use on a windshield wiper arm of either of the common types.

Another object of the invention is to provide a unitary molded wiper blade holder, the primary bow member of which has in a central portion thereof a self-contained structure for coupling it detachably with the side pin of a wiper arm of the side mounting type.

A further object is to provide such a blade holder which also has on the central portion of the primary bow member an integral structure for coupling it pivotally yet detachably with a connector that will receive and latch securely a wiper arm end of the bayonet mounting type.

Still another object is to provide a connector of unitary molded construction which, by virtue of its own self-contained structures, will couple pivotally yet detachably with mating elements on a central portion of a wiper blade holder and will receive and grasp securely yet detachably a wiper arm end of the bayonet mounting type.

The present wiper blade holder is generally similar to those of conventional windshield wipers in that it comprises a primary bow member, or yoke, which has means on a central portion thereof for coupling it with a wiper arm end and which carries on its ends secondary bow members, or yokes, formed with claws for slidably holding a flexible wiper blade unit, or blade refill, in working relation to the holder. Unlike most of the conventional structures, however, the blade holder per se is made economically as a unitary molding composed entirely of a suitably strong and resilient organic elastomer, or plastic material.

According to the invention, the arm coupling means of the blade holder comprise a unitary molded connector for coupling the holder with a wiper arm end of the bayonet mounting type and comprise structures molded integrally with a central portion of the primary bow member for coupling it with that connector and, alternatively, for coupling it directly with the side pin of a wiper arm of the side mounting type.

The body of the connector forms a saddle portion straddling said central portion and a tubular coupler portion protruding from the saddle portion along and over said central portion. The tubular coupler defines an elongate socket and a latch. The socket receives snugly, and the latch then interlocks detachably with the lateral detent protruding from a wiper arm end of the bayonet type. Formed integrally, respectively, with side panels of the saddle portion and with opposite sides of said central portion are coacting means for holding the connector pivotally yet detachably on said central portion. Thus, when the blade holder is to be used on a bayonet mounting arm it can be installed simply by thrusting the arm end into the socket of the connector.

For coupling with a side mounting wiper arm, the central portion of the primary bow member has a transverse socket formed by and inside a region of it which normally is obstructed by the side panels of the connector. This socket is made accessible for receiving and interlocking detachably with the side pin of the wiper arm by detachment of the side panels of the connector from the primary bow member. Being resilient, these panels can simply be sprung off. The transverse socket is defined by recessed regions of upper and lower sections of said central portion, which are separated by transverse slits and which form opposing shoulders in the socket that will be spread elastically apart by the head of a side mounting pin thrust into the socket and then engaged securely in the groove between the head and the shank of the pin.

The foregoing and other objects, features and advantages of the invention will be further apparent from the following detailed description and the accompanying drawing of an illustrative embodiment of the invention. In the drawing.

Figure 1:
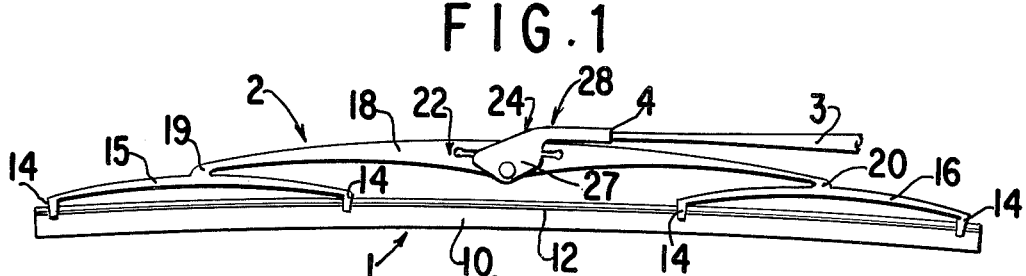
FIG. 1 is a side elevational view of the blade holder as assembled with a wiper blade unit and a wiper arm end of the bayonet mounting type.

The windshield wiper assembly shown in FIG. 1 comprises a replaceable blade unit 1 of well known type, a blade holder 2 according to the invention and a wiper arm 3 of the common bayonet mounting type. The blade unit includes a rubber wiping element, or squeegee, 10 having flexible backing strips 12 engaged in recesses along both sides of an either portion of its body. These strips are held slidably in claws 14 formed on the ends of the secondary bow members, or yokes, 15 and 16 of the blade holder. A suitable fastening or clip device (not shown) prevents the blade unit from sliding out of the claws in use.

Figures 2, 3:
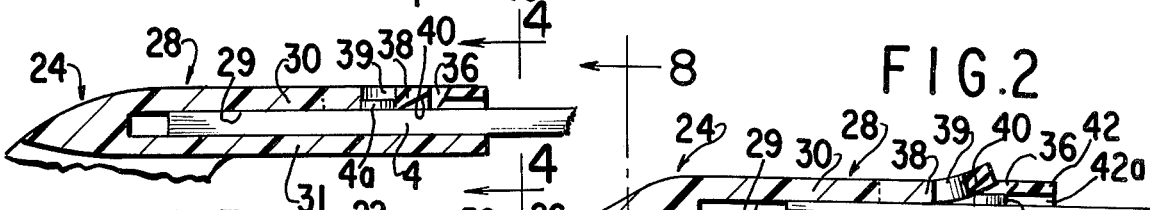
FIG. 2 is an enlarged vertical sectional view of the central portion of the primary bow member and the attached connector, with a bayonet arm end being inserted into the tubular coupler portion of the connector.
FIG. 3 is an enlarged vertical sectional view of the tubular coupler portion with the bayonet arm end latched in place.
Figure 4:
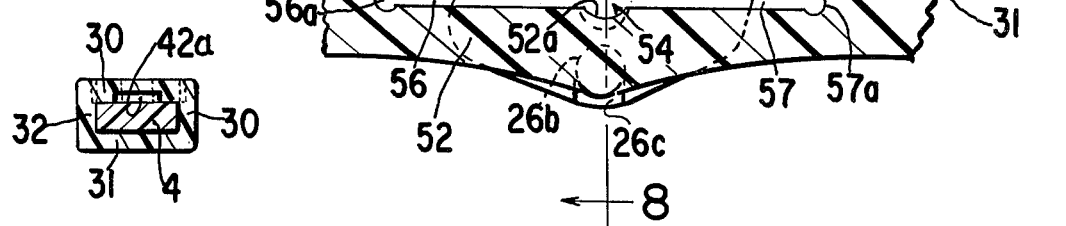
FIG. 4 is an end view thereof, taken along line 4 — 4 of FIG. 3.
Figure 5:
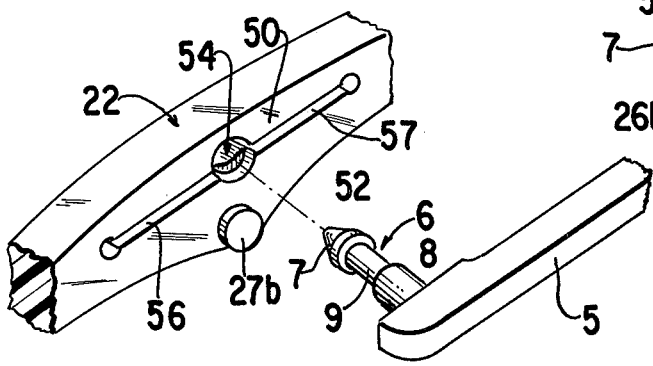
FIG. 5 is an exploded perspective view of the central portion of the primary bow member about to be coupled with the side pin of a wiper arm of the side mounting type.
Figure 6:
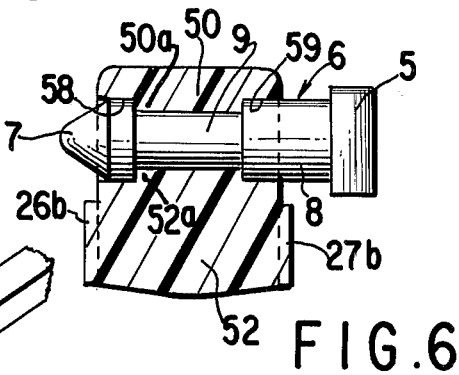
FIG. 6 is an enlarged transverse sectional view of said central portion as coupled with the side pin.
Figure 7:
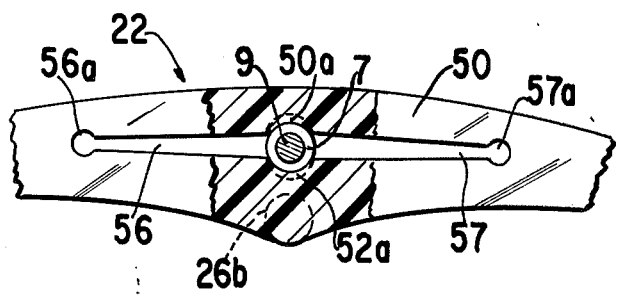
FIG. 7 is an enlarged side elevational view of the same, partly in section.

The secondary bow members 15 and 16 and the claws thereon are molded integrally with a primary bow member, or yoke, 18 the ends 19 and 20 of which are joined to respective central portions of the secondary bow members. The entire blade holder 2 is a unitary molding of a strong resilient organic elastomer, or plastic material, such, for example, as a polycarbonate resin impregnated with carbon black. A central portion 22 of the primary bow member 18 is provided with integrally molded structures for coupling it through a connector 24 with the bayonet mounting end 4 of wiper arm 3 as shown in FIGS. 2–3 and, alternatively, for coupling it directly with the side pin 6 of a common side mounting wiper arm 5 as shown in FIGS. 4–6.

The connector 24 is also a unitary molded body of a strong resilient elastomer, or plastic material, such, for example, as a polycarbonate resin impregnated with carbon black. It forms a saddle portion which straddles central portion 22, having substantially parallel resilient side panels 26 and 27 that depend respectively over the opposite sides of portion 22 at the center of member 18 and are held pivotally thereon by the engagement of cylindrical recesses 26a and 27a, formed in the inner sides of these panels, over fitting short cylindrical pivot posts 26b and 27b formed integrally with and protruding laterally from the opposite sides of portion 22. The side panels have lead-in ramps 26c, 27c (FIG. 8) below the recesses, which allow the connector 24 to be fastened in place by simply being pressed downward onto the blade holder until the recesses snap onto the molded pivot posts.

Figure 8:
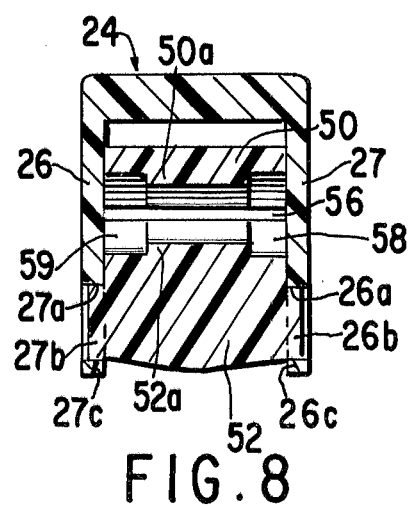
FIG. 8 is an enlarged transverse sectional view taken along line 8 — 8 of FIG. 2.

The pivot posts 26b and 27b are formed at locations on the sides of central portion 22 below a middle region thereof occupied by the structure provided for coupling the blade holder with a side mounting wiper arm. Thus, as seen in FIGS. 1, 2 and 8, the side panels 26 and 27 normally cover that middle region and obstruct access to that coupling structure. The resilience of these side panels, however, enables them to be spread apart elastically, as by the force of a person's fingers or with the aid of a simple blade, sufficiently to release the recesses 26a, 27a from the pivot posts for detachment of the connector 24, in this way giving access to the side arm coupling structure of the blade holder.

The connector 24 is formed with a tubular coupler portion 28 which protrudes from its saddle portion along and over a part of central portion 22 of the primary bow member. This coupler portion defines an elongate socket 29 of rectangular cross section, which is formed by integral top and bottom walls 30 and 31 and side walls 32 and 33 so that the socket 29 will receive snugly and confine all sides of the bayonet type wiper arm end 4.

Coupler portion 28 also defines a latch to interlock detachably with the laterally protruding detent 4a of the arm end 4, for which purpose top wall 30 has an opening 36 formed therein at a location spaced backward from the end of the coupler portion, and has a resilient tab portion 38 extending forwardly into the opening 36. The tab portion is formed with a central recess, or hole, 39 that will receive and interlock with the arm detent 4a. It also is formed with a sloped front surface 40 leading from its end toward the recess 39, and the front portion 42 of top wall 30 has a groove 42a formed in and along its inner side from the end of coupler portion 28 to the opening 36. Groove 42a is slightly deeper and slightly wider than the arm detent 4a.

Accordingly, when the bayonet end 4 of wiper arm 3 is inserted into the tubular coupler portion 28 of connector 24, the arm end is guided straight backward by the four confining walls of that portion, and the arm detent 4a slides freely in and along groove 42 to a location where it engages and bears against the sloped front surface 40 of tab portion 38. A further thrust of the arm causes detent 4a to spring tab portion 38 upwardly by camming action, as indicated in FIG. 2, so that the detent will move into and be latched by the hole or recess 39 in the tab portion. The wiper arm is then held snugly and securely in coupled relation to the connector 24, thus to the blade holder, as indicated in FIGS. 3 and 4.

Wiper arm end 4 can be detached from connector 24 whenever desired, such as for replacement of the blade holder or replacement of the wiper arm, by simply prying up the forward end of tab portion 38 to a position thereof releasing detent 4a from hole 39. To facilitate such detachment, front portion 40 of the top wall 30 is formed with a sloped backward edge bordering opening 36, whereby it is recessed from its outer side so as to admit a blade or other tool suitable for engaging and lifting the end of tab portion 38.

For the coupling of the blade holder with a side mounting wiper arm, the central portion 22 of the primary bow member is molded with an upper section 50 and a lower section 52 which form between them a transverse socket 54 for receiving and interlocking detachably with the side pin 6 of a side mounting wiper arm 5. These sections are separated by slits 56 and 57 which are formed transversely through and extend longitudinally along central portion 22 from opposite sides of the transverse socket 54, so that one of the sections 50, 52 is displaceable elastically away from the other by a pin or a tool thrusting them apart. Each of the slits 56 and 57 terminates in a rounded bore 56a or 57a which extends transversely through central portion 22 and has a diameter greater than the width of the slit.

The transverse socket 54 is defined between sections 50 and 52 by oppositely recessed inner surfaces of these sections, which are spaced apart a limited distance so as to form opposing concave shoulders 50a and 52a along a midportion of that socket and are spaced apart a greater distance at the opposite ends thereof so as to form nearly cylindrical recesses 58 and 59 between the sections at the ends of the socket. The end recesses 58 and 59 are of such diameter that they will receive freely and will constitute bearings for the head 7 and the shank 8 of the side pin 6 of arm 5. The shoulders 50a and 52a are so formed and spaced apart that they will engage in the recess, or groove, 9 of that pin between its head and its shank.

Accordingly, after detachment of the connector 24 from central portion 22 of the primary bow member, the transverse socket 54 of the latter may be interlocked pivotally with a side arm mounting pin 6 by simply being thrust onto the pin so as to cause elastic spreading of the shoulders 50a, 52a by the head 7 of the pin, followed by engagement of those shoulders in the recess 9 of the pin.

Once the blade holder and the side mounting arm 5 are so coupled together, they remain securely and serviceably coupled under all foreseeable conditions of use, or of tolerable abuse, of the windshield wiper. Again, however, the components can be detached easily, as for replacement of either of them, by simply prying sections 50 and 52 elastically apart by a suitable tool, e.g. by a screwdriver blade inserted in slot 56 or slot 57, until the shoulders 50a and 52a are spaced apart sufficiently to release the head 7 of pin 6.

We claim:

1. In a windshield wiper blade holder including a resilient molded primary bow member carrying thereon means for holding a flexible windshield wiping blade in working relation thereto and means on a central portion of said bow member for coupling it with the end of a windshield wiper arm, the improvement wherein said coupling means comprise a connector which is a unitary molded body forming a saddle portion straddling said central portion and forming a tubular coupler portion protruding from said saddle portion along and over said central portion, said coupler portion defining an elongate socket to receive snugly, and defining a latch to interlock detachably with a detent protruding laterally from, said arm end when said arm end is of the bayonet mounting type, coacting means integral respectively with side panels of said saddle portion and opposite sides of said central portion for holding said connector pivotally yet detachably on said central portion, and means including a transverse socket integrally formed by and inside a region of said central portion normally obstructed by said side panels for receiving and interlocking detachably with a side pin of said arm end when said arm end is of the side mounting type, whereby the blade holder is attachable to an serviceable on a wiper arm end of either of said types.

2. A blade holder according to claim 1, said side panels being resilient and substantially parallel and depending respectively over said opposite sides, said coacting means comprising pivot posts respectively integral with and protruding from said opposite sides and recesses in said side panels respectively fitted pivotally on said posts, said posts being at locations on said sides below said transverse socket so that said panels normally cover said transverse socket, said panels being elastically spreadable apart sufficiently to release said recesses from said posts for detachment of said connector.

3. A blade holder according to claim 1, said elongate socket being defined by four integral walls of said coupler portion which fit upon and confine all sides of a wiper arm end of the bayonet type inserted thereinto, one of said walls having an opening formed therein at a location spaced away from the end of said coupler portion and comprising a resilient tab portion extending into said opening, said tab portion having a recess formed therein to receive and interlock detachably with said detent and having a sloped inner surface leading from its end toward said recess, said one wall having a groove formed in and along its inner side from said coupler end to said opening, whereby upon insertion of said bayonet arm end into said socket said detent will pass freely in and along said groove, then to and along said sloped surface so as to spring said tab portion outward and then into latched engagement with said recess.

4. A blade holder according to claim 3, a portion of the outer side of said one wall adjacent to said opening being recessed to admit a tool for engaging and lifting the end of said tab portion and thereby releasing said detent for detachment of said bayonet arm end.

5. A blade holder according to claim 1, said central portion comprising upper and lower sections thereof which define said transverse socket and are separated by slits formed transversely through and which extend longitudinally along said central portion from opposite sides of said transverse socket, said slits rendering one of said sections displaceable elastically away from the other, said sections presently oppositely recessed inner surfaces spaced apart a limited distance so as to form opposing concave shoulders along a midportion of said transverse socket and spaced apart a greater distance at opposite ends thereof, whereby after detachment of said connector from said central portion said transverse socket may be interlocked with said mounting pin by being thrust thereonto so as to cause elastic spreading of said shoulders by the head of the pin followed by engagement of said shoulders in the recess between the head and the shank of the pin.

6. A blade holder according to claim 5, each of said slits terminating in a rounded bore which extends transversely through said central portion and has a diameter greater than the width of the slit.

7. A connector for coupling a windshield wiper blade holder with the end of a windshield wiper arm of the bayonet mounting type, which arm has a detent protruding laterally from a face thereof, comprising a unitary molded body forming a saddle portion for straddling a central portion of said holder and forming a tubular coupler portion defining a socket to receive said arm end and a latch to interlock detachably with said detent, said coupler portion protruding from said saddle portion so as to be able to extend over and along a central portion of the primary bow member of said holder, said saddle portion comprising substantially parallel resilient side panels depending therefrom and adapted to fit over opposite sides of said central portion, said panels respectively having recesses therein adapted to fit pivotally on posts respectively protruding from said opposite sides of said central portion, said coupler portion having four integral walls which define said socket and fit upon and confine all sides of said arm end inserted therein, one of said walls having an opening formed therein at a location spaced away from the end of said coupler and comprising a resilient tab portion extending into said opening, said tab portion having a recess formed therein to receive and interlock detachably with said detent and having a sloped inner surface leading from its end toward said recess, said one wall having a groove formed in and along its inner side from said coupler end to said opening, whereby upon insertion of said bayonet arm end into said socket said detent will pass freely in and along said groove, then to and along said sloped surface so as to spring said tab portion outward and then into latched engagement with said recess.

8. A connector according to claim 7, a portion of the outer side of said one wall adjacent to said opening being recessed to admit a tool for engaging and lifting the end of said tab portion and thereby releasing said detent for detachment of said bayonet arm end.

9. In a windshield wiper blade holder including a resilient molded primary bow member carrying thereon means for holding a flexible windshield wiping blade in working relation therto and having means on a central portion of said bow member for coupling it with the mounting pin on the end of a windshield wiper arm of the side mounting type, the improvement wherein said coupling means comprise a transverse socket formed by and inside a region of said central portion for receiving and interlocking detachably with said pin, said central portion comprising upper and lower sections thereof which define said transverse socket and are separated by slits formed transversely through and which extend longitudinally along said central portion from opposite sides of said transverse socket, said slits rendering one of said sections displaceable elastically away from the other, said sections presenting oppositely recessed inner surfaces spaced apart a limited distance so as to form opposing concave shoulders along a midportion of said transverse socket, and spaced apart a greater distance at opposite ends thereof, whereby said transverse socket may be interlocked with said mounting pin by being thrust thereonto so as to cause elastic spreading of said shoulders by the head of the pin followed by engagement of said shoulders in the recess between the head and the shank of the pin.

10. A blade holder according to claim 9, each of said slits terminating in a rounded bore, which extends transversely through said central portion and has a diameter greater than the width of the slit.

* * * * *